United States Patent

Henning

[11] 4,014,866
[45] Mar. 29, 1977

[54] BARIUM LAKED PHENYLAZONAPHTHALENE DYE CONTAINING SULFONIC ACID GROUPS

[75] Inventor: Georg Henning, Ludwigshafen, Germany

[73] Assignee: BASF Aktiengesellschaft, Ludwigshafen (Rhein), Germany

[22] Filed: May 29, 1975

[21] Appl. No.: 581,714

Related U.S. Application Data

[63] Continuation-in-part of Ser. Nos. 297,198, Oct. 13, 1972, abandoned, and Ser. No. 414,715, Nov. 12, 1973, abandoned.

[30] Foreign Application Priority Data

Oct. 20, 1971 Germany .......................... 2152190

[52] U.S. Cl. ..................... 260/200; 106/23; 106/288 Q; 260/42.21; 260/508; 260/512 C; 427/407 C

[51] Int. Cl.² .................. C09B 29/16; C09D 11/00; D06P 1/06; D06P 3/00

[58] Field of Search ..................... 260/200

[56] References Cited

UNITED STATES PATENTS

| 333,042 | 12/1885 | Vollbrecht et al. | 260/200 |
|---|---|---|---|
| 765,079 | 7/1904 | Julius et al. | 260/200 |
| 787,768 | 4/1905 | Julius et al. | 260/200 |
| 789,096 | 5/1905 | Julius et al. | 260/200 |
| 830,312 | 9/1906 | Ernst | 260/200 |
| 1,878,698 | 9/1932 | Hentrich et al. | 260/200 |
| 2,117,859 | 5/1938 | Siegel | 260/200 |
| 2,948,715 | 8/1960 | Siebert et al. | 260/204 |
| 3,578,652 | 5/1971 | Rast et al. | 260/151 |

*Primary Examiner*—Floyd D. Higel
*Attorney, Agent, or Firm*—Johnston, Keil, Thompson & Shurtleff

[57] ABSTRACT

Azo dyes containing sulfonic acid groups laked with barium and derived from an anilinesulfonic acid as diazo component and a β-naphtholsulfonic acid as coupling component for example a dye of the formula

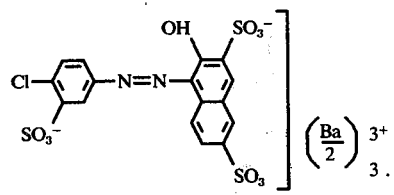

The dyes are eminently suitable as pigments for coloring surface coating compositions, printing inks and particlarly resins.

1 Claim, No Drawings

BARIUM LAKED PHENYLAZONAPHTHALENE DYE CONTAINING SULFONIC ACID GROUPS

This application is a continuation-in-part of our co-pending applications Ser. Nos. 297,198 filed Oct. 13, 1972 now abandoned, and 414,715, filed Nov. 12, 1973, now abandoned.

The invention relates to dyes of the formula (I):

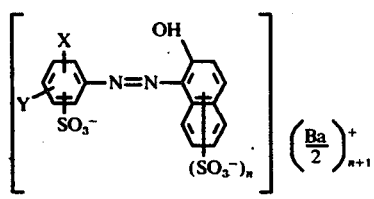

in which
X is hydrogen, chlorine or methyl;
Y is hydrogen, chlorine or methyl; and
$n$ is one of the integers 1 and 2.

The new dyes are yellow to red and are suitable as pigments for printing inks, coating compositions and particularly for incorporation into plastics such as polyolefins, polyvinyl chloride or polystyrene.

Very fast colorations are obtained which are distinguished by excellent fastness to light, migration and overcoating.

Dyes of the formula (Ia):

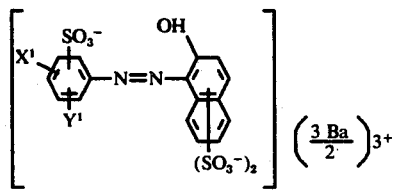

in which
$X^1$ is chlorine or methyl; and
$Y^1$ is hydrogen, chlorine or methyl have particular industrial importance.

Compounds of the formula (I) may be prepared by coupline a diazo compound of an amine of the formula (II):

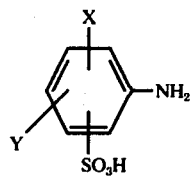

with a compound of the formula (III):

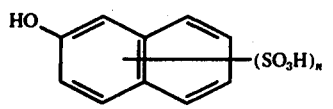

and converting the reaction product into the barium lake.

Examples of compounds of the formula (II) are:
aniline-o-sulfonic acid,
metanilic acid,
sulfanilic acid,
5-chloroaniline-2-sulfonic acid,
4-chloroaniline-2-sulfonic acid,
3,4-dichloroaniline-2-sulfonic acid,
2-chloro-5-toluidine-4-sulfonic acid,
4-toluidine-3-sulfonic acid,
2-chloro-4-toluidine-5-sulfonic acid,
4-toluidine-2-sulfonic acid,
2-toluidine-4-sulfonic acid,
2,4-dimethylaniline-5-sulfonic acid,
2,5-dichloroaniline-4-sulfonic acid,
2-toluidine-5-sulfonic acid,
3-toluidine-6-sulfonic acid,
4-chloroaniline-3-sulfonic acid,
2-chloroaniline-5-sulfonic acid,
2,4-dichloroaniline-5-sulfonic acid,
3,4-dichloroaniline-5-sulfonic acid,
3,6-dichloroaniline-5-sulfonic acid,
3-chloro-4-methylaniline-5-sulfonic acid,
3-chloro-6-methylaniline-5-sulfonic acid,
3-chloroaniline-5-sulfonic acid, and
3-methyl-6-chloroaniline-5-sulfonic acid.

Examples of compounds of the formula (III) are:
2-naphthol-6-sulfonic acid,
2-naphthol-7-sulfonic acid,
2-naphthol-8-sulfonic acid,
2-naphthol-3,6-disulfonic acid (R-acid) and preferably
2-naphthol-6,8-disulfonic acid (G-acid).

The dyes are prepared by a conventional method by diazotization of the amine, coupling with the naphtholsulfonic acid in the weakly acid to alkaline range followed by laking with a barium salt. The suspension and/or solution containing the diazonium salt and the naphtholsulfonic acid, adjusted to the weakly acid or alkaline range by adding a base, is generally used for the coupling. The coupling is preferably carried out in a pH range of from 7.5 to 8. Examples of suitable bases for adjusting the pH are alkali metal hydroxides (sodium and/or potassium) or an aqueous solution of ammonia, and the corresponding carbonates or hydrogen carbonates. Following coupling, the suspension and/or solution of the alkali metal or ammonium salt of the azo dye may be laked at a temperature of from 0° to 100° C by adding a solid or dissolved barium salt, preferably barium chloride.

Another possible method consists in adding the barium salt to an acid suspension and/or solution containing the diazonium salt and the coupling components and then setting up a weakly acid to alkaline range by adding a base. The abovementioned compounds are suitable as bases.

In both of these methods the barium lake is deposited as a precipitate and can be separated by a conventional method, for example by filtration.

A form of the dye which is particularly suitable as a pigment is obtained by adding an organic solvent such as ethanol, dimethylformamide, N-methylpyrrolidone, glycol or methyl glycolate in an amount of from 10 to 250% by volume prior to precipitation of the barium lake color.

After the crude pigment has been precipitated the reaction mixture may be heated with or without additional solvent for some time, preferably for from 15 minutes to 1 hour, at a temperature of from 30° to 100° to achieve a favorable pigmentary form.

Another method of achieving a crystalline form which is particularly suitable for use as a pigment consists in after-treating the filtered crude pigment in another operation in an organic solvent such as ethanol, a glycol, glycol ether or N-methylpyrrolidone or preferably in dimethylformamide or water or mixtures of the same at a temperature of from 100° to 180° so that larger or better crystallized pigment particles are obtained.

Parts and percentages hereinafter mentioned are by weight.

General directions for production:

1. $A^+$ parts of diazo component and $B^+$ parts of β-naphtholsulfonic acid ($^+$ note the abbreviations used in the Table below are dissolved in a mixture of 180 parts of water and 20 parts of 25% ammonia solution. The whole is then acidified with 50 parts of concentrated hydrochloric acid, cooled with ice to 0° to 5° C and diazotized by adding 32 parts of a 23% sodium nitrite solution. The mixture is stirred for another two hours and then 45 parts of a 25% ammonia solution is added to the reaction mixture which is again stirred and the pigment is precipitated by adding 42 parts of barium chloride.

2. The procedure is as in Example (1) but the 42 parts of barium chloride is added after diazotization and prior to coupling.

3. The procedure is as in Examples (1) and (2) but 300 parts of dimethylformamide is added prior to the addition of barium chloride.

4. The procedure is as in Examples (1), (2) and (3) but the whole is heated for an hour after the crude pigment has been precipitated. The whole is then allowed to cool and the product is filtered off.

5. Production is according to any of Examples (1) to (4) but the end product is suction filtered, then ten times its amount of dimethylformamide is added, and the whole is boiled for one hour and then suction filtered.

Pigments are thus obtained which differ in the crystalline structure and size of particle and which may be used for different purposes depending on the method.

The following abbreviations are used in the Table:
A = parts of diazonium component
B = parts of designated acid
D = diazonium component
E = aniline-o-sulfonic acid
F = metanilic acid
G = sulfanilic acid
H = 5-chloroaniline-2-sulfonic acid
I = 4-chloroaniline-2-sulfonic acid
J = 3,4-dichloroaniline-2-sulfonic acid
K = 2-chloro-5-toluidine-4-sulfonic acid
L = 4-toluidine-3-sulfonic acid
M = 2-chloro-4-toluidine-5-sulfonic acid
N = 4-toluidine-2-sulfonic acid
O = 2-toluidine-5-sulfonic acid
P = 2,4-dimethylaniline-5-sulfonic acid
Q = 2,5-dichloroaniline-5-sulfonic acid
R = 3-toluidine-6-sulfonic acid
S = 4-chloroaniline-3-sulfonic acid
T = 2-chloroaniline-5-sulfonic acid
BG = parts of G-acid
BR = parts of R-acid
CP = parts of pigment

| A | D | BG | BR | CP | Shade |
|---|---|---|---|---|---|
| 17.5 | E | 29 | — | 50 | orange |
|  |  | — | 29 | 63 | pale red |
| 17.5 | F | 29 | — | 50 | orange |
|  |  | — | 29 | 65 | dark red |
| 17.5 | G | 29 | — | 50 | orange |
|  |  | — | 29 | 51 | red brown |
| 21 | H | 29 | — | 54 | orange |
|  |  | — | 29 | 60 | dark red |
| 21 | I | 29 | — | 55 | red |
|  |  | — | 29 | 55 | dark red |
| 24 | J | 29 | — | 60 | orange |
|  |  | — | 29 | 61 | dark red |
| 22 | K | 29 | — | 65 | red |
|  |  | — | 29 | 60 | red |
| 19 | L | 29 | — | 60 | red |
|  |  | — | 29 | 65 | orange |
| 22 | M | 29 | — | 65 | red |
|  |  | — | 29 | 65 | orange |
| 19 | N | 29 | — | 68 | red |
|  |  | — | 29 | 68 | red |
| 19 | O | 29 | — | 58 | orange |
|  |  | — | 29 | 63 | dark red |
| 19.5 | P | 29 | — | 10 | dark red |
|  |  | — | 29 | 66 | dark red |
| 24 | Q | 29 | — | 16 | red |
|  |  | — | 29 | 68 | dark red |
| 19 | R | 29 | — | 65 | orange |
|  |  | — | 29 | 53 | red |
| 21 | S | 29 | — | 65 | yellow |
|  |  | — | 29 | 65 | red |
| 21 | T | 29 | — | 60 | orange |
|  |  | — | 29 | 63 | dark red |

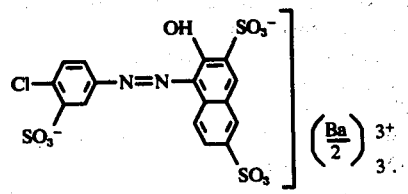

I claim:
1. The pigment of the formula: